(12) United States Patent
Tueno et al.

(10) Patent No.: US 12,155,754 B2
(45) Date of Patent: Nov. 26, 2024

(54) SECURE INTEGER COMPARISON USING BINARY TREES

(71) Applicant: SAP SE, Walldorf (DE)

(72) Inventors: Anselme Tueno, Ettlingen (DE); Jonas Janneck, Mannheim (DE)

(73) Assignee: SAP SE, Walldorf (DE)

( * ) Notice: Subject to any disclaimer, the term of this patent is extended or adjusted under 35 U.S.C. 154(b) by 415 days.

(21) Appl. No.: 17/525,372

(22) Filed: Nov. 12, 2021

(65) Prior Publication Data
US 2023/0155815 A1 May 18, 2023

(51) Int. Cl.
*H04L 9/32* (2006.01)
*H04L 9/00* (2022.01)
*H04L 9/06* (2006.01)
*H04L 9/08* (2006.01)

(52) U.S. Cl.
CPC ............ *H04L 9/0836* (2013.01); *H04L 9/008* (2013.01); *H04L 9/0662* (2013.01); *H04L 9/0825* (2013.01)

(58) Field of Classification Search
CPC ..... H04L 9/0836; H04L 9/008; H04L 9/0662; H04L 9/0825; H04L 2209/46; H04L 63/0428; G06F 21/6245
See application file for complete search history.

(56) References Cited

U.S. PATENT DOCUMENTS

| | | | |
|---|---|---|---|
| 8,856,138 B1 * | 10/2014 | Neubeck | G06F 16/90344 707/745 |
| 2012/0066410 A1 * | 3/2012 | Stefanakis | H04L 45/742 709/245 |
| 2012/0084544 A1 * | 4/2012 | Farina | G06F 21/575 713/2 |
| 2013/0124502 A1 * | 5/2013 | Prieditis | G06F 16/245 707/719 |
| 2016/0156595 A1 * | 6/2016 | Wu | H04L 9/008 713/168 |
| 2017/0149557 A1 | 5/2017 | Bacon et al. | |

(Continued)

OTHER PUBLICATIONS

Tueno, A and Boev, Y and Kerschbaum, F "Non-Interactive Private Decision Tree Evaluation" Sep. 18, 2019 [retrieved on Jan. 31, 2024]. Retrieved from the internet: <URL: https://arxiv.org/pdf/1909.08362.pdf> (Year: 2019).*

(Continued)

*Primary Examiner* — Michael Simitoski
*Assistant Examiner* — Hany S. Gadalla
(74) *Attorney, Agent, or Firm* — SCHWEGMAN LUNDBERG & WOESSNER, P.A.

(57) ABSTRACT

Systems, methods, and computer-readable media are disclosed for secure integer comparison using binary trees. A server may receive a first encrypted input and a public encryption key from a client. The server may create a binary tree representing a second encrypted input. The server may evaluate the first encrypted input on the binary tree. The evaluation may comprise computing decision bits along a plurality of paths of the binary tree. The decision bits may then be aggregated along each path of the binary tree and the (Continued)

aggregation stored at a leaf node of each path. The leaf node of each path may be evaluated to obtain a comparison result. The comparison result may be encrypted with the public encryption key. The server may send the comparison result to the client for decryption. The comparison result may indicate whether the first input was larger than the second input.

20 Claims, 11 Drawing Sheets

(56) References Cited

U.S. PATENT DOCUMENTS

| | | | |
|---|---|---|---|
| 2019/0190714 | A1 | 6/2019 | Joye et al. |
| 2020/0252260 | A1* | 8/2020 | Tseng .................... H04L 41/046 |
| 2020/0279045 | A1* | 9/2020 | Tueno ...................... G06F 7/24 |
| 2022/0109574 | A1* | 4/2022 | Narumanchi ......... H04L 9/3242 |
| 2023/0359631 | A1* | 11/2023 | Badrinarayanan .......................... G06F 21/6245 |

OTHER PUBLICATIONS

Liang Xue et al. "Secure and Privacy-Preserving Decision Tree Classification with Lower Complexity" Journal of Communications and Information Networks, vol. 5, No. 1, Mar. 2020 [retrieved on Jun. 18, 2024]. Retrieved from the internet: <URL: https://ieeexplore.ieee.org/stamp/stamp.jsp?tp=&arnumber=9055107> (Year: 2020).*

Dr. Anselme Tueno; Evaluating private branching programs on encrypted inputs; Master's Thesis; Dec. 11, 2020; p. 1-42; Universite de Paris.

Jung Hee Cheon et al.; Search- and-compute on Encrypted Data; 2015; p. 1-27.

Geoffroy Couteau; New Protocols for Secure Equality Test and Comparison; 2018; p. 1-34; KIT, Karlsruhe, Germany.

Josef Pieprzyk et al.; Information Security and Privacy; ACISP; Jul. 2-4, 2007; p. 1-486; Townsville, Australia.

Marc Fischlin; A Cost-Effective Pay-Per-Multiplication Comparison Method for Millionaires; Fachbereich Mathematik (AG 7.2); retrieved Sep. 24, 2021; p. 1-15; Johann Wolfgang Goethe-Universitat Frankfurt am Main.

Craig Gentry et al.; Private Database Access With HE-over-ORAM Architecture; May 16, 2014; p. 1-29.

Jung Hee Cheon et al.; Homomorphic Computation of Edit Distance; retrieved Sep. 24, 2021; p. 1-14; Seoul National University (SNU), Republic of Korea.

Andrew C. Yao; Protocols for Secure Computations; retrieved Sep. 24, 2021; p. 1-5; University of California Berkeley.

"European Application Serial No. 22184392.3, Extended European Search Report mailed Dec. 14,2022", 34 pgs.

* cited by examiner

FIG. 7A y=3; x=1; μ=3; β=1

SECURE INTEGER COMPARISON USING BINARY TREES

TECHNICAL FIELD

Embodiments generally relate to multiparty computation. More specifically, embodiments relate to systems and methods of secure integer comparison using binary trees in a homomorphic encryption system.

RELATED ART

Multiparty computation (MPC) is a cryptographic technique that allows several parties to compute a function on their private inputs without revealing any information other than the function's output. Yao's Millionaires' problem is a classic MPC example which describes two millionaires that are interested in knowing which of them is richer without revealing their actual wealth. More generally, Yao's Millionaires' problem is the issue in which there are two numbers, x and y, and it is desired to determine whether the inequality x≥y is true or false without revealing the actual values of x and y.

Yao's Millionaires' problem can also be viewed as a form of integer comparison, one of the basic arithmetic operations in computer programming and algorithm design. Secure integer comparison is necessary in many privacy-preserving computations. In machine learning, private integers must be compared securely while evaluating classifiers such as decision trees or neural networks. In secure enterprise benchmarking between companies, the companies' key performance indicators must be compared without revealing to the other companies the values of the KPIs. In secure auctions, bids must be compared between bidders without revealing the bid amounts.

Previous methods of secure integer comparison utilize interactive protocols that require client interaction. Other methods rely upon excessive homomorphic encryption operations, leading to a computationally expensive comparison protocol.

Accordingly, a need exists for a more efficient and secure method of integer comparison that makes as few expensive homomorphic operations as possible while providing a non-interactive protocol.

SUMMARY

Disclosed embodiments address the above-mentioned problems by providing systems and methods for secure integer comparison using binary decision trees in a homomorphic encryption scheme. A server may receive a first encrypted input from a client. The server may create a binary tree based on a second input. In some embodiments, the second input is encrypted. The server may evaluate the first encrypted input on the binary tree to determine an encrypted comparison result. The server may send the encrypted comparison result to the client for decryption. The server may then receive the decrypted comparison result indicating whether the first input is greater than or equal to the second input without revealing the value of the first input or the second input. The secure integer comparison may be implemented using homomorphic encryption.

A first embodiment is directed to a one or more non-transitory computer-readable media storing computer-executable instructions that, when executed by a processor, perform a method for secure integer comparison using binary trees, the method comprising receiving, at a server and from a client, a public encryption key and a first encrypted input, the first encrypted input encrypted with the public encryption key, creating, at the server, a binary tree, the binary tree based on a second encrypted input, evaluating, at the server, the first encrypted input on the binary tree, the evaluation comprising: computing decision bits along a plurality of paths of the binary tree, aggregating the decision bits along each path of the binary tree, the aggregated decision bits stored at a leaf node of each path, and evaluating the leaf node of each path to obtain an encrypted comparison result, and sending, from the server to the client, the encrypted comparison result for decryption by the client, the encrypted comparison result encrypted using the public encryption key.

A second embodiment is directed to a computer-implemented method for secure integer comparison using binary trees, the computer-implemented method comprising receiving, at a server and from a client, a first encrypted input, creating, at the server, a binary tree, the binary tree based on a second input, evaluating, at the server, the first input on the binary tree to determine an encrypted comparison result, sending, from the server to the client, the encrypted comparison result for decryption by the client, and receiving, at the server and from the client, the decryption of the encrypted comparison result. The first input may be encrypted using a fully homomorphic encryption scheme.

A third embodiment is directed to a system for secure integer comparison using binary trees, the system comprising a processor, a data store, and one or more non-transitory computer-readable media storing computer-executable instructions that, when executed by the processor, perform a method for secure integer comparison using binary trees, the method comprising receiving, at a server and from a client, a first input, creating, at the server, a data structure, the data structure based on a second input, evaluating, at the server, the first input on the data structure to obtain an encrypted comparison result, and sending, from the server to the client, the encrypted comparison result for decryption by the client. The first input may be encrypted using an additively homomorphic encryption scheme.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments are described in detail below with reference to the attached drawing figures, wherein:

FIG. 7A illustrates an example binary tree array and evaluation of the example binary tree array for certain embodiments;

Figure 1:
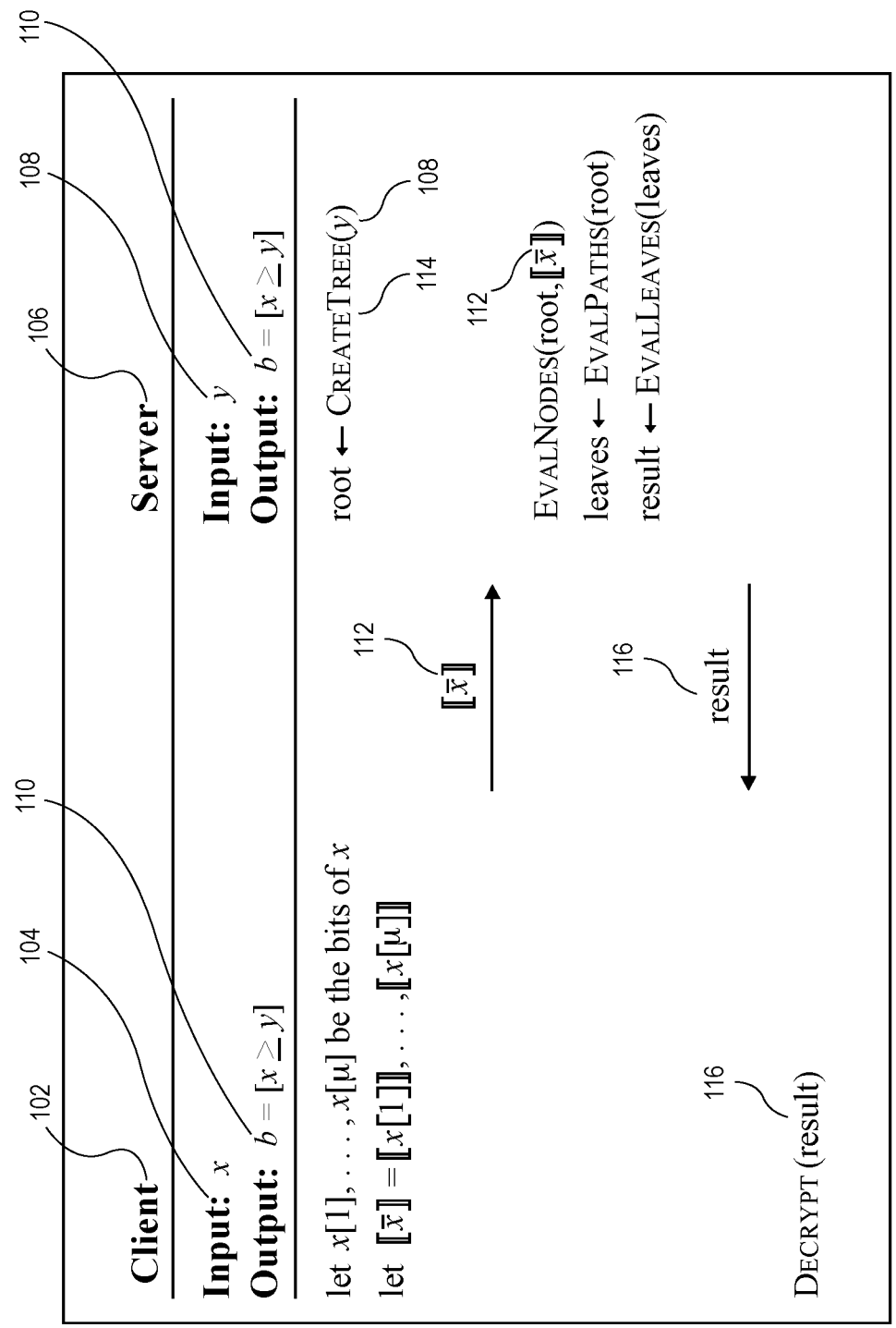
FIG. 1 illustrates a secure integer comparison protocol using binary trees for certain embodiments.

The drawing figures do not limit the disclosure to the specific embodiments disclosed and described herein. The drawings are not necessarily to scale, emphasis instead being placed upon clearly illustrating the principles of the disclosure.

DETAILED DESCRIPTION

Systems and methods for secure integer comparison are described herein. Secure integer comparison may be utilized to compare inputs from parties, wherein each party has a private integer. A branching program implemented as a binary tree may be used for the evaluation. A party having input x is considered to be the client, and a party having input y is considered to be the server. The server may construct a binary tree representing y. The client may encrypt x according to a homomorphic encryption scheme and send the encrypted x (denoted as $[\![x]\!]$) to the server. The server may evaluate $[\![x]\!]$ on the binary tree to obtain an encrypted comparison result. The server may send the encrypted comparison result to the client for decryption. The goal of the computation is to compare the integers securely and reveal to the parties which integer is larger without revealing the values of the integers themselves. The secure integer comparison may be performed non-interactively to reduce the communication overhand and/or the computational overhead (e.g., the client's computational overhead). Further, the secure integer comparison may be output expressive, such that the comparison may be embedded into a larger protocol and further applications may be applied to the output of the comparison. In some embodiments, the server input is encrypted. In some embodiments, the client input and the server input are sent to a third-party server for evaluation.

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosure in sufficient detail to enable those skilled in the art to practice the present teachings. Other embodiments can be utilized, and changes can be made without departing from the claimed scope. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Embodiments described herein utilize various homomorphic encryption (HE) schemes for performing computations on ciphertexts and for generating an encrypted result such that the decryption of the encrypted result is equivalent to the result of a function on the corresponding plaintexts. As will be discussed in further detail below, the implementation details of the secure integer comparison protocol using binary trees may vary based on the HE scheme selected. An HE scheme as used in embodiments herein may comprise the following algorithms:

PK, SK, EK←KGen($\lambda$): A probabilistic algorithm that takes a security parameter, $\lambda$, and outputs public (PK), private (SK), and evaluation (EK) keys.

c←Enc(PK, m): The probabilistic encryption algorithm that encrypts a message, m, using PK and outputs a ciphertext, c. As used herein, $[\![m]\!]$ represents Enc(PK, m).

c←Eval (EK, f, $c_1$, . . . , $c_n$): The evaluation algorithm takes EK, an n-ary function, f, and n ciphertexts $c_1$ . . . $c_n$ and outputs a ciphertext c.

m'←Dec(SK, c): This deterministic algorithm takes SK and a ciphertext, c, and outputs a message m'.

Embodiments herein may utilize indistinguishability under chosen-plaintext attack (IND-CPA) security and the following correctness conditions. Given any set of n plaintexts $m_1$ . . . $m_n$, it must hold for PK, SK, EK:

Dec(SK,Enc(PK,$m_i$))=Dec(SK,$[\![m_i]\!]$)=$m_i$, and

Dec(SK,Eval(EK,f,$[\![m_1]\!]$, . . . ,$[\![m_n]\!]$))=Dec(SK,
$[\![f(m_1, \ldots ,m_n)]\!]$)

In practice, an HE scheme defines two basic operations for addition and multiplication that may then be used to compute larger functionalities. An HE scheme in which both addition and multiplication operations are supported is referred to as a fully homomorphic scheme (FHE). For FHE, as used herein, the following operations and short hands may be utilized for all plaintexts $m_1$, $m_2$:

Addition: Add($[\![m_1]\!]$,$[\![m_2]\!]$)=$[\![m_1]\!] \boxplus [\![m_2]\!]$=$[\![m_1+m_2]\!]$, Constant Addition: AddCons($[\![m_1]\!]$,$m_2$)=$[\![m_1]\!]$ $\boxplus$ $m_2$=$[\![m_1+m_2]\!]$, Multiplication: $\text{Mul}(\llbracket m_1 \rrbracket, \llbracket m_2 \rrbracket) = \llbracket m_1 \rrbracket \boxdot \llbracket m_2 \rrbracket = \llbracket m_1 \cdot m_2 \rrbracket$, and Constant Multiplication: $\text{MulCons}(\llbracket m_1 \rrbracket, m_2) = \llbracket m_1 \rrbracket$, $m_2 = \llbracket m_1 \rrbracket \boxdot m_2 = \llbracket m_1 \cdot m_2 \rrbracket$.

FHE schemes may further be classified into somewhat homomorphic encryption (SHE) and leveled homomorphic encryption. HE schemes that support both addition and multiplication, but only for a limited number of times, are considered to be SHEs. In leveled FHE, computations are only evaluated up to a certain circuit depth that is fixed by the encryption keys. Implementing FHE may require bootstrapping, a computationally expensive method. As such, leveled FHE may be employed to increase computational efficiency.

If the HE scheme supports only addition, the scheme is referred to as additively homomorphic (AHE). Example AHE schemes include Pallier and Elliptic Curve ElGamal. For AHE, as used herein, the following properties may be utilized for all integer plaintexts $m_1$, $m_2$ and bit plaintexts a, b $\in \{0,1\}$:

Addition: $\text{Add}(\llbracket m_1 \rrbracket, \llbracket m_2 \rrbracket) = \llbracket m_1 \rrbracket \boxplus \llbracket m_2 \rrbracket = \llbracket m_1 + m_2 \rrbracket$, Constant Multiplication: $\text{MulCons}(\llbracket m_1 \rrbracket, m_2) = \llbracket m_1 \rrbracket \boxdot m_2 = \llbracket m_1 \cdot m_2 \rrbracket$, and Xor: $X_{OR}(\llbracket a \rrbracket, b) = \text{Add}(\llbracket b \rrbracket, \text{MulCons}(\llbracket a \rrbracket, (-1)^b)) = \llbracket a \oplus b \rrbracket$.

FIG. 1 illustrates protocol 100 for secure integer comparison using binary trees for some embodiments. Protocol 100 may be implemented using AHE, FHE, or variations thereof. The variable β is used herein to denote whether the homomorphic encryption scheme is AHE or FHE. If the scheme AHE, β=0, and if the scheme is FHE, β=1. As shown, protocol 100 may comprise a client 102 holding client input 104 (also referred to as x) and a server 106 holding server input 108 (also referred to as y). In some embodiments, client input 104 and server input 108 are both integers with a bitlength μ. In some embodiments, μ is public. In some embodiments, protocol 100 may be implemented with integers having bitlengths up to 128 bits. The goal of protocol 100 is to compare client input 104 with server input 108 and return an output 110 indicative of whether client input 104 is larger than or equal to server input 108. In some embodiments, output 110 comprises a bit b indicative of whether x≥y is true. If the equality is true, output 110 may be one; if the equality is false, output 110 may be zero.

Protocol 100 may begin with the generation of the one-time key (PK, SK, EK) described above. In some embodiments, client 102 generates the one-time key and sends PK, EK to server 106. In some embodiments, client 102 and server 106 share the one-time key and send PK, EK to a third-party server for evaluation. In some such embodiments, server 106 functions as a second client. In some embodiments, client 102 sends two inputs to server 106 or a third-party server for evaluation.

Client 102 may encrypt client input 104 bitwise (using PK) to obtain encrypted client input 112 (denoted $\llbracket \bar{x} \rrbracket = \llbracket x[1] \rrbracket, \ldots, \llbracket x[\mu] \rrbracket$). In some embodiments, x[μ] represents the most significant bit of client input 104. Client 102 may send encrypted client input 112 to server 106 for evaluation.

Once received, server 106 may create a binary tree 114 representative of server input 108. In some embodiments, server 106 creates binary tree 114 prior to receiving encrypted client input 112. In some embodiments, binary tree 114 is encrypted homomorphically using PK. In some embodiments, binary tree 114 represents all bit strings of bit length μ. Binary tree 114 may comprise inner nodes and terminal nodes. Each inner node may comprise two child nodes. Each terminal node may comprise zero child nodes. A node with no parent node may be referred to as the root node.

Server 106 then evaluates encrypted client input 112 on binary tree 114. The evaluation may comprise comparing decision bits, aggregating decision bits, and evaluating leaves, as discussed in further detail below. Once evaluated, server 106 may send result 116 to client 102. Result 116 may comprise the encrypted form of output 110. In some embodiments, result 116 is encrypted with PK. As such, once received, client 102 may decrypt result 116 (using SK) to obtain output 110. In some embodiments, protocol 100 is a non-interactive protocol such that all calculations are performed without requiring interaction by client 102.

In some embodiments, shares of output 110 bit b are returned to server 106 and client 102, thus preventing server 106 and/or client 102 from learning any intermediate results. In some embodiments, server 106 computes a bit $b_s$ and a bit $b_c$, wherein $b = b_c \oplus b_s$. Server 106 may store $b_s$ and send $b_c$ to client 102.

Figure 2:
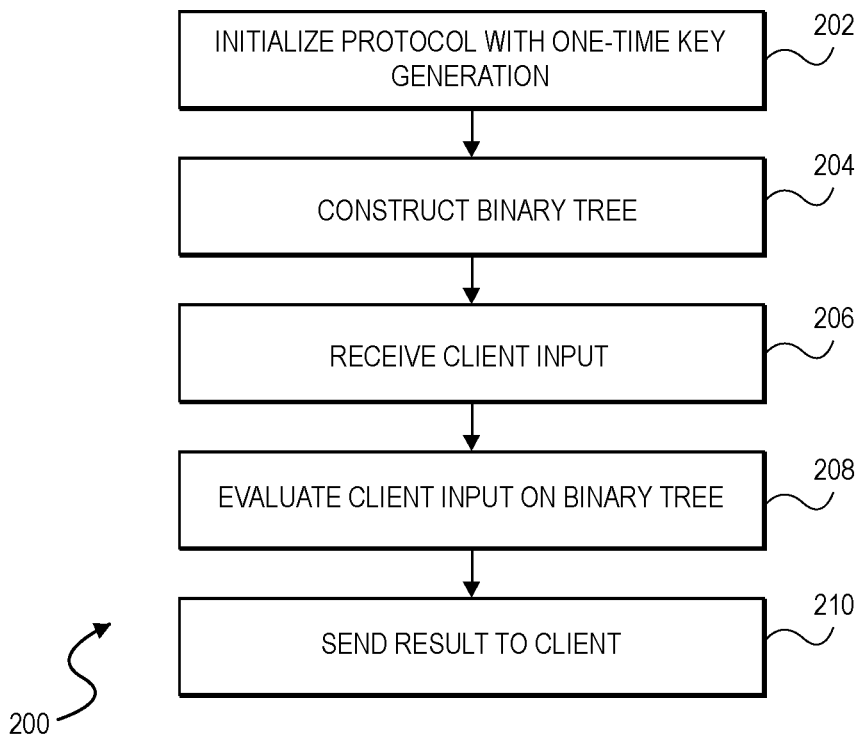
FIG. 2 illustrates an exemplary method for the secure integer comparison protocol using binary trees for certain embodiments.

FIG. 2 illustrates an exemplary method 200 outlining protocol 100 for the secure integer comparison using binary trees for some embodiments. At step 202, protocol 100 may be initialized. The initialization may comprise a one-time key generation. In some embodiments, client 102 generates a triple (PK, SK, EK) of public, private, and evaluation keys for the HE scheme. Client 102 may send PK, EK to server 106.

At step 204, server 106 may construct binary tree 114. As discussed further below, binary tree 114 may comprise one of a binary comparison tree, a normal comparison binary tree, or an inverse normal comparison binary tree. In some embodiments, binary tree 114 represents the server input 108. As discussed below, binary tree 114 may be pruned (half-pruned or fully-pruned) to increase efficiency of protocol 100. The construction of binary tree 114 is discussed in further detail below with respect to FIGS. 3A, 3B, and 4A.

At step 206, when client 102 wishes to compare client input 104 against a server input 108, client 102 may encrypt client input 104 using PK and send encrypted client input 112 to server 106 for evaluation. In some embodiments, client input 104 is encrypted bitwise, such that client 102 computes the bit presentation $\bar{x} = x[1], \ldots, x[\mu]$ and sends the corresponding ciphertext $\llbracket \bar{x} \rrbracket = \llbracket x[1] \rrbracket, \ldots, \llbracket x[\mu] \rrbracket$ to server 106. In some embodiments, the ordering of steps 204 and 206 are interchangeable, and binary tree 114 may be constructed in response to receiving client input 104.

Next, at step 208, server 106 may evaluate encrypted client input 112 on binary tree 114. In some embodiments, the evaluation comprises comparison of decision bits, aggregation of decision bits, and evaluation of leaves to obtain result 116. Evaluation of binary tree 114 is described in further detail below with respect to FIG. 5. Evaluation of binary tree 114 may return result 116, which may be encrypted by server 106 using PK.

At step 210, server 106 may send result 116 back to client 102. In some embodiments, if method 200 is implemented using FHE, result 116 comprises a single encrypted bit. In some embodiments, if method 200 is implemented using AHE, result 116 comprises μ ciphertexts among which at most one of the μ ciphertexts encrypts 0 and the remaining ciphertexts encrypt random plaintext. Decryption of result 116 is discussed in further detail below with respect to FIGS. 6A and 6B.

Figure 3A:
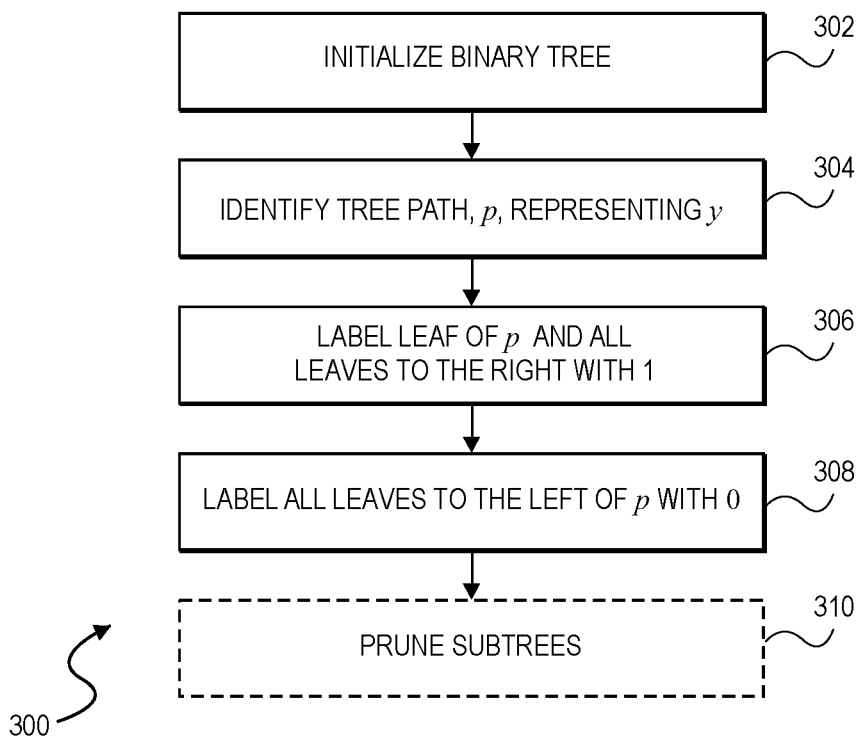
FIG. 3A illustrates a first method for creating a binary tree for certain embodiments.

FIG. 3A illustrates a first method 300 of creating binary tree 114 for some embodiments. At step 302, binary tree 114 may be initialized. In some embodiments, binary tree 114 is created to represent all bit strings of length μ. As such, initialization of binary tree 114 may comprise creating a binary tree 114 with all edges labeled with one or zero. At step 304, once binary tree 114 is initialized, the path in binary tree 114 that represents server input 108 may be identified. The path representing server input 108 may comprise the path with edge labels corresponding to the binary representation of server input 108 starting from the most significant bit of server input 108 at the root node. The path on binary tree 114 representing server input 108 is referred to hereinafter as path p. Next, at step 306, the leaf of path p and the leaves of all paths to the right of path p on binary tree 114 may be labeled with one. At step 308, leaves to the left of path p on binary tree 114 may be labeled with zero. At this point, binary tree 114 may be fully complete, with all leaf nodes labeled with ones or zeroes. As such, traversing binary tree 114 with bits of encrypted client input 112 may lead to a leaf node labeled with zero if client input 104 is less than server input 108, and may lead to a leaf node labeled with one if client input 104 is greater than or equal to server input 108.

At optional step 310, subtrees of binary tree 114 may be pruned. Pruning binary tree 114 may result in a simpler binary tree 114 and a more efficient protocol 100 because pruned subtrees may not have to be evaluated by server 106. In some embodiments, all subtrees that are labeled with the same bit are pruned. That is, if an inner node of binary tree 114 comprises two child nodes labeled with the same bit b, the child nodes of the inner node may be removed from the tree. Thereafter, the inner node may be transformed into a leaf node. In some embodiments, the inner node is transformed into a leaf node and labeled with the bit b.

Constructing a binary comparison tree according to method 300 may result in a binary tree 114 that is unnecessarily large. In some embodiments, binary tree 114 may be pruned to simplify binary tree 114 without losing the meaning provided by the full binary tree 114 generated according to the method 300. Binary tree 114 may be pruned to be full-pruned or half-pruned. A full-pruned binary tree 114 comprises a binary tree in which no inner node has child nodes comprising leaves with the same label. A half-pruned binary tree 114 comprises a binary tree having a depth of bitlength equivalent to server input 108 and, for each non-deepest inner node, exactly one child node is a leaf node. For a binary tree 114, the tree depth is equivalent to the number of edges on the longest path. The depth of a node is equivalent to the number of edges between the node and the root node. A deepest inner node comprises a node whose child nodes are both leaf nodes with a node depth equivalent to the depth of binary tree 114.

Figure 3B:
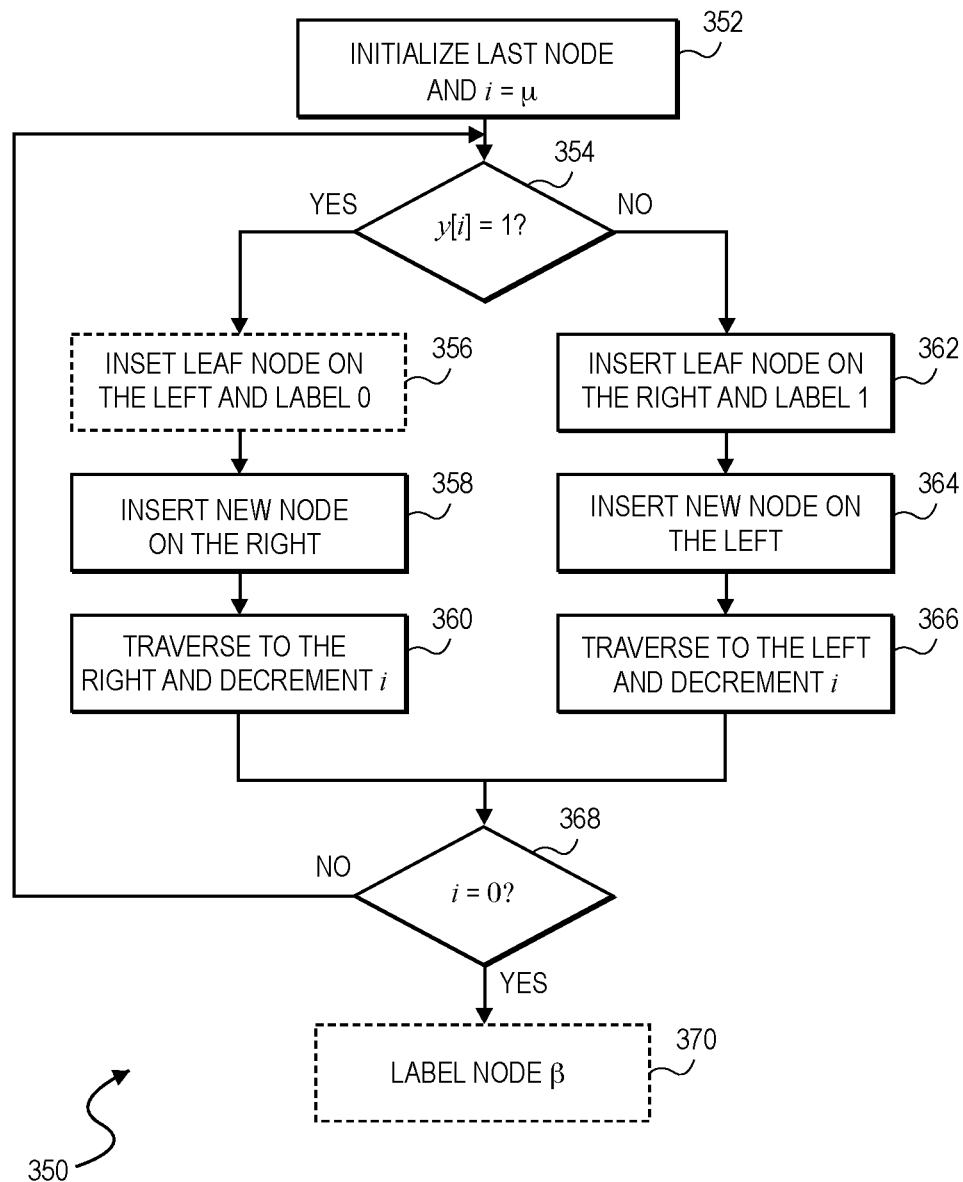
FIG. 3B illustrates a second method for creating the binary tree for certain embodiments.

Looking now at FIG. 3B, a second method 350 of creating binary tree 114 is illustrated for some embodiments. Method 350 outlines a method of creating a pruned binary tree 114 without creating a full binary tree and then pruning subtrees. In some embodiments, creating the full binary tree 114 (representing all bit strings of length μ) and then pruning the full binary tree 114 as described above may be avoided by traversing binary tree 114 a single time with the bits of server input 108 and replacing non-traversed subtrees with a leaf node. Method 350 may begin at step 352 where the root node of binary tree 114 may be initialized and an index, i, is set to μ, (i.e., the most significant bit of server input 108). At this point, binary tree 114 may comprise only the root node and no other nodes.

At step 354, it may be determined whether the bit (i.e., y[i]) of server input 108, at index i is equivalent to one. If the bit is equivalent to one, processing may proceed to step 356. If the bit is not equivalent to one (i.e., the bit is zero), processing may proceed to step 362.

At step 356, where y[i]=1 is true, a leaf node may be inserted on the left of the node and labeled with zero. In some embodiments, step 356 is optional and only performed in the FHE scheme. In some embodiments, in the AHE scheme, when y[i]=1 is true, a leaf node on the left is not inserted, and processing proceeds to step 358. At step 358, a new node may be inserted on the right of the leaf node. At step 360, binary tree 114 may be traversed to the right of the leaf node to the new node and i is decremented. Next, at step 368, it may be determined if i=0 is true or false. If true, processing may proceed to optional step 370 whereby the new node inserted at step 358 is labeled with β. In some embodiments, step 370 is only implemented in the FHE scheme.

At step 362, where y[i]=0, a leaf node may be inserted on the right of the node and labelled with one. Thereafter, at step 364, a new node may then be inserted to the left of the leaf node. At step 366, binary tree 114 may be traversed to the left of the leaf node, to the new node, and i is decremented. Next, at step 368, it may be determined if i=0 is true or false. If true, processing may proceed to optional step 370 whereby the new node inserted at step 364 is labeled with β. In some embodiments, step 370 is only implemented in the FHE scheme.

As described above, when binary tree 114 is implemented in a AHE scheme, no leaf node is inserted on the left of the traversed path when y[i]=1. As such, in some embodiments, binary tree 114 may comprise only paths which can be evaluated to zero. That is, binary tree 114 may comprise paths labeled with integers that are larger than or equal to server input 108.

As previously mentioned, protocol 100 may be ran with server input 108 encrypted or unencrypted. Leaving server input 108 unencrypted may be permissible when server 106 is performing the homomorphic operations on server input 108 and client input 104. However, when client 102 and server 106 send client input 104 and server input 108 to a separate server, server input 108 may be encrypted to protect the privacy of server input 108. For example, in a secure auction setting, client 102 and server 106 (server 106 functioning as a second client 102) may be two bidders who send their input to an auction-hosting server for secure integer comparison to determine the highest bidder. Encrypting server input 108 may therefore be advisable for enhanced privacy. Encrypting server input 108 may still be advisable when server 106 implements protocol 100 to increase security against malicious parties. When both client input 104 and server input 108 are encrypted, server 106 may perform comparison of client input 104 and server input 108 with the help of client 102 or another server having the decryption key. In some embodiments, server 106 only requires the aid of client 102 or another server in the AHE scheme.

To handle encrypted inputs in the FHE scheme, server 106 may construct a binary tree 114 as described above. As previously described, binary tree 114 may comprise a binary tree in which edges and leaves of binary tree 114 are labeled with zero or one. As such, for every integer of client input 104, traversing binary tree 114 along a path labeled with the bits of client input 104 reaches a leaf labeled with one if client input 104 is greater than or equal to server input 108 and reaches a leaf labeled with zero otherwise. In some embodiments, traversal of binary tree 114 begins at the root node with the most significant bit of client input 104. It should be noted that for secure comparison in which client input 104 and server input 108 are both encrypted, the binary tree 114 may be evaluated on encrypted client input 112. As such, for secure comparison, in which server input 108 and client input 104 are encrypted, traversal of binary tree 114 is such that there is at most one path wherein client input 104 evaluates to one if the scheme is FHE and evaluates to zero if the scheme is AHE. For all other paths of binary tree 114, client input 104 evaluates to zero if the scheme is FHE, and to a random plaintext that is not zero if the scheme is AHE.

In some embodiments, a normal comparison binary tree 450 (see FIG. 4B) is created for the case in which client input 104 and server input 108 are both encrypted. Both client input 104 and server input 108 may be encrypted using PK from the one-time key as described above. In some embodiments, client 102 and server 106 hold the one-time key and send client input 104 and server input 108 (along with PK, EK) to a third-party server for evaluation. As such, the client 102 and server 106 may know PK, SK, EK while the third-party server may only know PK.

A normal comparison binary tree 450 may be built based on the input size of client input 104 and server input 108 but independent of the actual values of client input 104 and server input 108. In some embodiments, normal comparison binary tree 450 can be built when bits of server input 108 are homomorphically encrypted. For a normal comparison binary tree 450, there may be a leftmost path of length μ labeled with the bits of server input 108. Normal comparison binary tree 450 may also comprise a deepest inner node of the leftmost path comprising a left leaf node labeled with β (i.e., 1 if FHE or 0 if AHE). Further, each inner node of the leftmost path may have a right child leaf node. Additionally, each inner node may be labeled with b on the left edge, 1−b on the right edge, and $F_β(b)$ on the right child node of the inner node. In some embodiments, $F_β(b)$ depends upon whether the protocol 100 is implemented with an FHE scheme or an AHE scheme. For an FHE scheme, $F_β=⟦1−b⟧$ with arithmetic encoding or $F_β=⟦1+b⟧$ for binary encoding, as the addition is modulo two. For an AHE scheme, $F_β=⟦b⟧$.

In some embodiments, a normal comparison binary tree 450 of server input 108 is equivalent to a half-pruned binary tree 114 of server input 108. In some embodiments, a normal comparison binary tree comprises μ+1 leaves, with at most μ leaves labeled with one in the FHE case. In some embodiments, in the AHE case, at most μ leaves are labeled with zero. In the AHE case, the paths corresponding to the leaves labeled with zero may be created and evaluated and sent back to client 102. That is, if n represents the number of leaves labeled with zero in the AHE case, exactly the paths corresponding to the n leaves are created, evaluated and sent back with additional μ−n random ciphertexts to client 102.

Figure 4A:
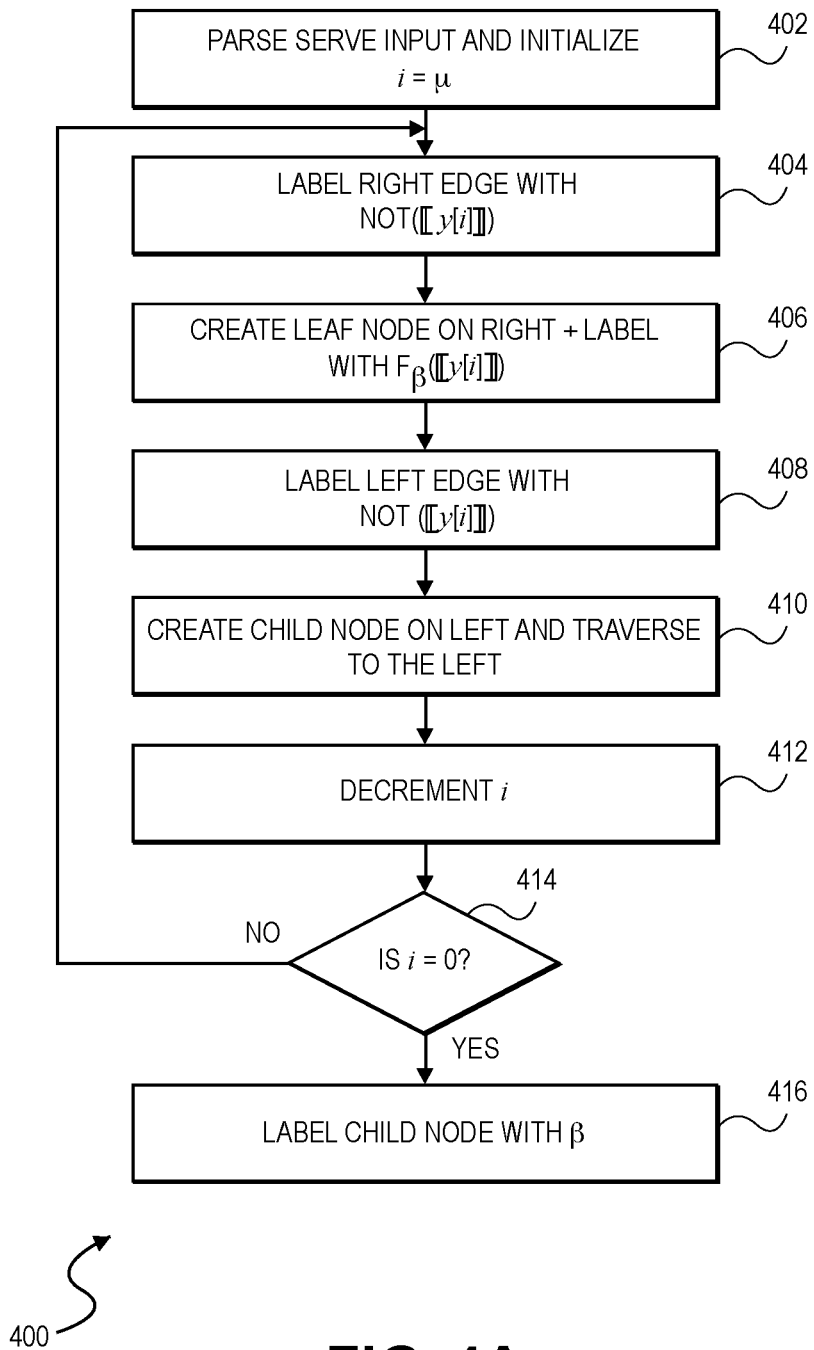
FIG. 4A illustrates an exemplary method for creating a normal comparison binary tree for certain embodiments.

FIG. 4A illustrates a method 400 for creating normal comparison binary tree 450 for server input 108 for some embodiments. In some embodiments, normal comparison binary tree 450 may be created by computing Not-operations as ⟦¬b⟧=⟦1−b⟧=ADD(⟦1⟧, MULCONS(⟦b⟧, −1)). Method 400 may begin after receiving server input 108 from server 106. In some embodiments, creation of normal comparison binary tree 450 is performed by server 106 or a third-party server. At step 402, server input 108 may be parsed and an index i may be initialized to be equivalent to the bitlength μ. As described above, server input 108 may be encrypted bitwise using the public encryption key. As such, parsing server input 108 may result in the encrypted bits of server input 108 (i.e., ⟦ȳ⟧ is parsed to ⟦y[1]⟧, . . . , ⟦y[μ]⟧).

Creation of normal comparison binary tree 450 may begin at the root node of the tree as described above. At step 404, the right edge of the node may be labeled with NOT⟦y[i]⟧. As such, if y[i]=0, the right edge may be labeled with one, and if y[i]=1, the right edge may be labeled with zero. Next, at step 406, a leaf node may be created as a right child node of the current node, and the leaf node may be labeled with $F_β(⟦y[i]⟧)$.

At step 408, the left edge of the current node may be labeled with ⟦y[i]⟧. Thereafter, at step 410, a child node may be created on the left and the normal comparison binary tree 450 traversed thereto.

At step 412, the index i may be decremented by one. At step 414, a check may be performed to determine whether or not i=0. If i=0 is true, processing may proceed to step 416. If i=0 is false, processing may proceed back to step 404.

At step 416, where i=0 is true, the child node created at step 410 may be labeled with β. As such, normal comparison binary tree 450 may comprise the leftmost path labeled with the bits of server input 108.

Figure 4B:
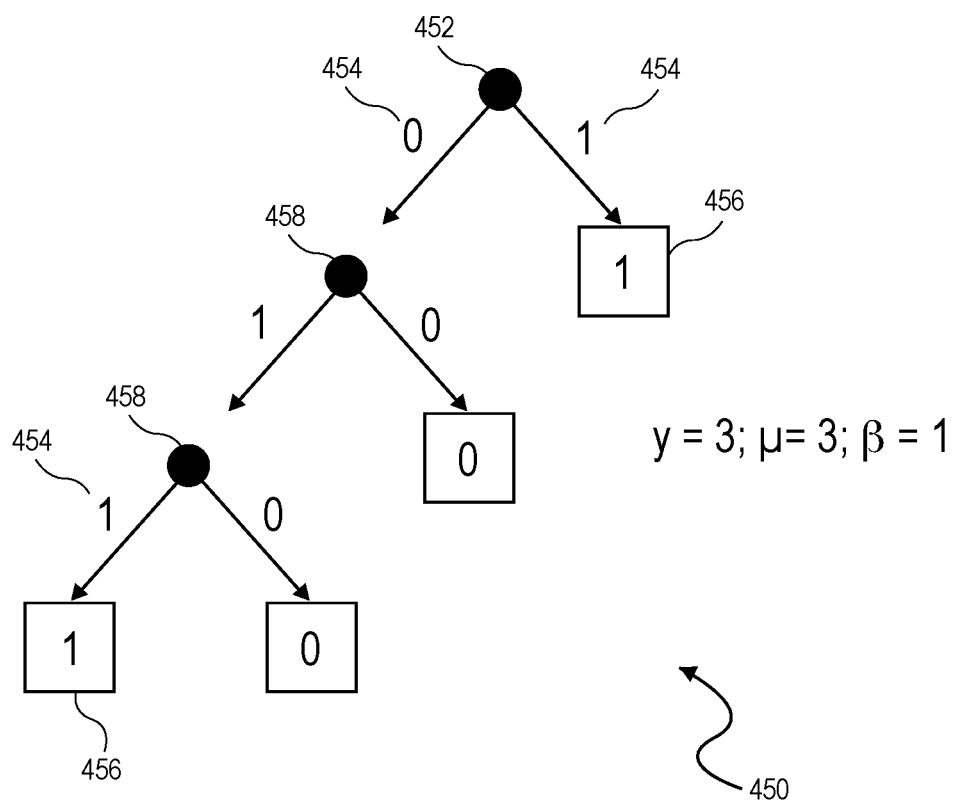
FIG. 4B illustrates an example normal comparison binary tree for certain embodiments.

FIG. 4B illustrates an example normal comparison binary tree 450 created according to method 400 with server input 108=3, μ=3, and implemented with FHE for some embodiments. As shown normal comparison binary tree 450 comprises a root node 452, edge labels 454, leaf nodes 456, and inner nodes 458. As described above, creation of normal comparison binary tree 450 may begin at root node 452. As such, for the edge label 454 on the right of root node 452, the value is NOT⟦0⟧=⟦1⟧. Similarly, for the edge label 454 on the right of root node 452, the value is ⟦0⟧. Additionally, for the right leaf node 456, the value is $F_β$= ⟦1−b⟧=⟦1⟧. A left child node may then be created and the above-described process repeated for the rest of normal comparison binary tree 450.

In some embodiments, server 106 can choose between evaluating the greater-than or the less-than case. The greater-than case may be with binary tree 114 or normal comparison binary tree 450. To evaluate the less-than case, an inverse normal comparison binary tree may be created. The inverse normal comparison binary tree may comprise a rightmost path of length μ labeled with the bits of server input 108. Additionally, there may be a deepest inner node of the rightmost path having a left leaf node labeled with β. Each inner node of the inverse normal comparison binary tree may comprise a left child leaf node.

An inverse normal comparison binary tree may be created according to method 400 outlined above with the following differences. All leaf nodes, except for the leftmost leaf node, may be labeled with $1−F_β(b)$. Each inner node may comprise a left edge label 454 labeled with b and a right edge label 454 labeled with 1−b.

Figure 5:
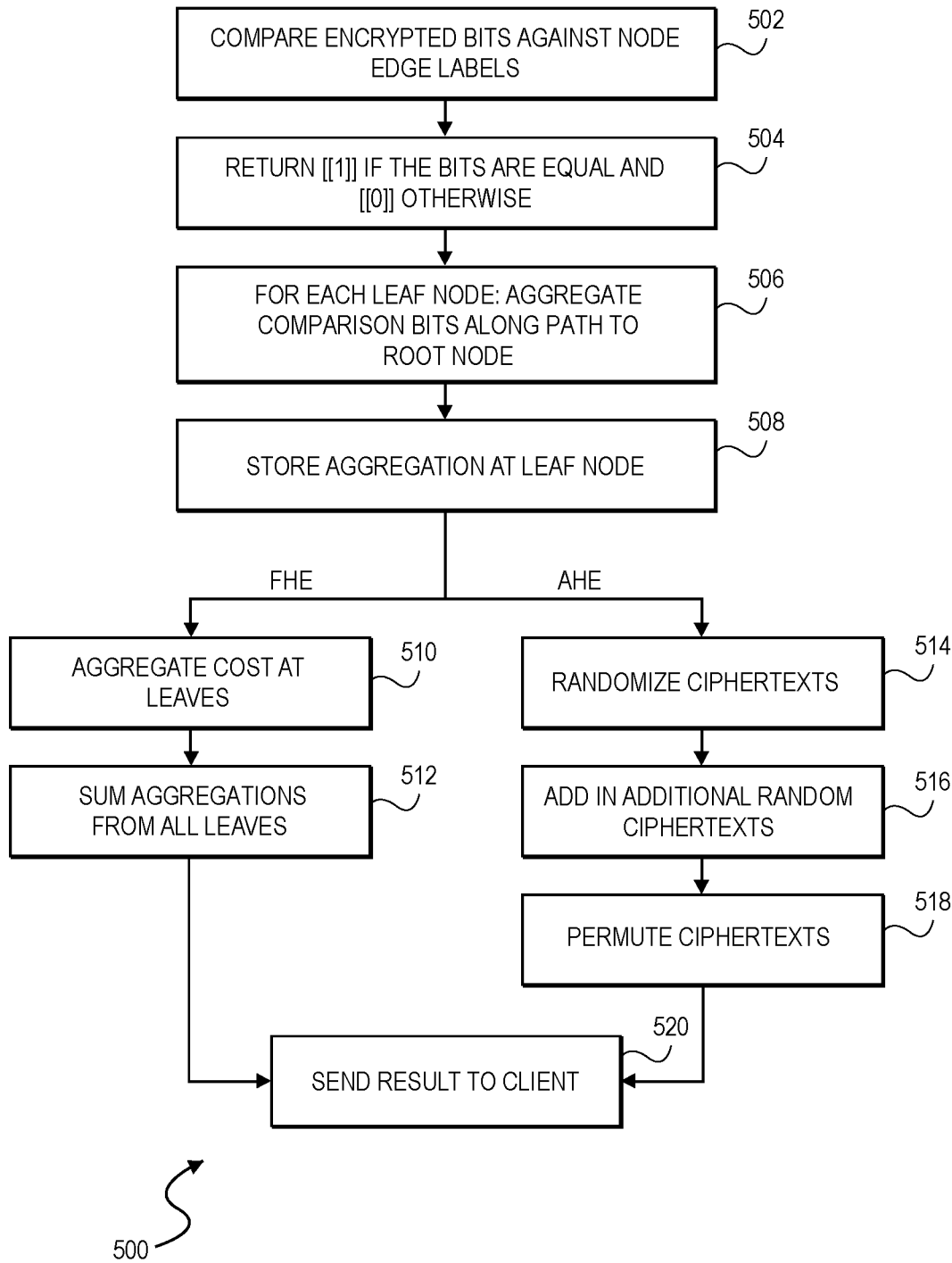
FIG. 5 illustrates an exemplary method for evaluating binary trees for certain embodiments.

FIG. 5 illustrates a method 500 for evaluating client input 104 on binary tree 114 for some embodiments (binary tree 114 is used hereinafter as representative of normal comparison binary tree 450 and its inverse). As described above, evaluation of binary tree 114 may comprise the computation of decision bits, (outlined in steps 502 and 504), aggregation of comparison bits (outlined in steps 506 and 508), and evaluation of leaves (outlined in steps 510-520).

At step 502, decision bits may be computed. As described above, client 102 may encrypt client input 104 to obtain encrypted client input 112 which may be sent to server 106. Server 106 may then evaluate encrypted client input 112 by computing decision bits. In some embodiments, server 106 computes decision bits by comparing each ciphertext bit of encrypted client input 112 (i.e., ⟦ x[i] ⟧ ) against edge labels 454 of a node of binary tree 114. The comparison may comprise a bit equality test.

At step 504, the comparison results are returned. If the two bits are equal, the bit equality test may return encrypted one (i.e., ⟦ 1 ⟧ ). If the two bits are unequal, the bit equality test may return encrypted zero (i.e., ⟦ 0 ⟧ ). In some embodiments, if protocol 100 utilizes an FHE scheme, an FHE $X_{NOR}$ gate is utilized for comparing decision bits. In some embodiments, if protocol 100 utilizes an AHE scheme, the inequality is implemented using an AHE $X_{OR}$ gate. In some embodiments, edge labels 454 of binary tree 114 are not encrypted in an AHE scheme. For the AHE case in which client input 104 and server input 108 are both encrypted, comparison of decision bits may comprise applying $X_{OR}$-operations on the bits of encrypted client input 112 along paths of normal comparison binary tree 450. In some embodiments, an $X_{OR}$-operation on two encrypted bits ⟦ a ⟧ and ⟦ b ⟧ is computed as ⟦ a⊕b ⟧ =⟦ a−b ⟧.

Next, at step 506, the comparison bits determined above may be aggregated. In some embodiments, comparison bits are aggregated along the path from root node 452 to each leaf node 456 in binary tree 114. If the scheme is FHE, the comparison bits may be aggregated using homomorphic multiplication of the comparison bits. If the scheme is AHE, the comparison bits may be aggregated using homomorphic addition of the comparison bits.

When comparing and aggregating comparison bits in an AHE scheme, if $X_{OR}$-results of a path comprise ⟦ 1 ⟧ and ⟦ −1 ⟧ (i.e., the $X_{OR}$-operation of two encrypted bits ⟦ a ⟧ and ⟦ b ⟧ is computed as ⟦ a⊕b ⟧ =⟦ a−b ⟧ ), the aggregation of such a path may also evaluate to zero. Thus, to alleviate this issue (since this path should not result to zero), the $X_{OR}$-result may be multiplied at level i (i.e., edges starting at a node with depth i) by $2^i$ prior to aggregating the results along the paths. Because $2^i$ is a constant number, the multiplication can be applied on an AHE ciphertext. As such, after multiplying by $2^i$, the aggregation of the path may no longer evaluate to zero.

At step 508, the aggregation result may be stored at the leaf node 456 of the corresponding path upon which the comparison bits were aggregated. In some embodiments, aggregation is implemented using a queue and traversing binary tree 114 in BFS (Breadth-first search) order. Alternatively, or additionally, binary tree 114 may be traversed using depth-first search, iterative deepening search, or any other tree searching algorithm. In some embodiments, the aggregation computation may be improved by using path prefixes for binary tree 114. In some embodiments, for two or more paths having the same prefix, the prefix is evaluated a single time. After comparison and aggregation of the bits, processing may proceed to step 510 if the HE scheme is fully homomorphic, or to step 516 if the HE scheme is additively homomorphic.

At step 510, for FHE encryption, a cost attribute at each leaf node 456 of binary tree 114 may be aggregated. After the aggregation outlined in step 506 is complete, each leaf node 456 may store a cost value. In some embodiments, each leaf node 456 of binary tree 114 stores a cost value of encrypted zero (⟦ 0 ⟧ ) or a cost value of encrypted one (⟦ 1 ⟧ ). In some embodiments, there is a unique leaf node 456 in binary tree 114 storing a cost of ⟦ 1 ⟧ , with all other leaf nodes storing a cost of ⟦ 0 ⟧ . Server 106 may then aggregate the cost value for each leaf node 456 by computing, the product of the cost of the leaf node 456 with the value of the label of leaf node 456. At step 512, the result of the computation may then be summed across all leaf nodes 456 in binary tree 114 to obtain result 116. At step 520, result 116 may be sent to client 102.

For AHE, after aggregation of the comparison bits, each leaf node 456 in binary tree 114 may store a cost value of ⟦ 0 ⟧ or a cost value of an encrypted random plaintext (⟦ r ⟧ ). In some embodiments, binary tree 114 comprises at most one leaf node 456 with a cost of ⟦ 0 ⟧ , and all other leaf nodes 456 in binary tree 114 comprise a cost of ⟦ r ⟧ . As such, at step 514, server 106 may randomize all ciphertexts. At step 516, additional random ciphertexts may be generated by server 106 and added into the list of already-present ciphertexts. Next, at step 518, server 106 may permute all ciphertexts. Lastly, processing may proceed to step 520 whereby server 106 sends result 116 (in the form of p permuted ciphertexts) to client 102, thus preserving the privacy of server 106. Randomization and permutation of the ciphertexts may also aid in preventing leakage of the structure of binary tree 114. Leakage of tree structure may allow for malicious actors to obtain information about server input 108.

In the AHE scheme with both inputs encrypted, if client input 104 is greater than or equal to server input 108, exactly one path of binary tree 114 may have $X_{OR}$-results equal to zero, such that the sum along the paths is zero. The remaining paths of the normal comparison tree may have at least one $X_{OR}$-result that is not zero, thus resulting in an aggregation of comparison bits that is not zero. Consequently, a path result is the aggregation of comparison bits along it and the final comparison result 116 may be determined by checking if there is a path result that is zero.

Figure 6A:
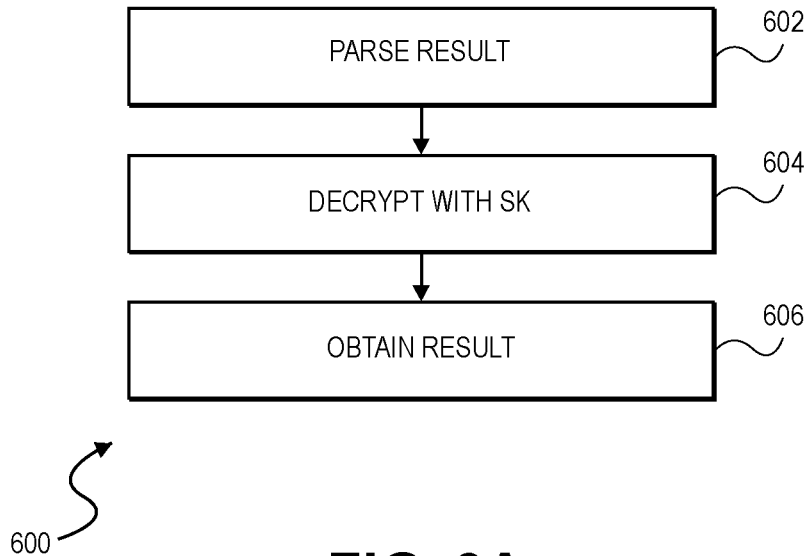
FIG. 6A illustrates an exemplary method for decrypting the secure integer comparison result in a fully homomorphic encryption scheme for certain embodiments.

FIG. 6A illustrates a method 600 for decrypting result 116 in a FHE scheme for some embodiments. As described in step 520 above, server 106 may send result 116 back to client 102 for decryption to learn the output 110. For a FHE scheme, result 116 may be sent to client 102 as a single encrypted bit. Once received, at step 602, client 102 may parse result 116 to obtain an encrypted bit ⟦ b ⟧ . At step 604, the encrypted bit may be decrypted using SK. Thereafter, at step 606, output 110 may be obtained comprising the comparison result between client input 104 and server input 108. In some embodiments, client 102 may then share the comparison result with server 106.

Figure 6B:
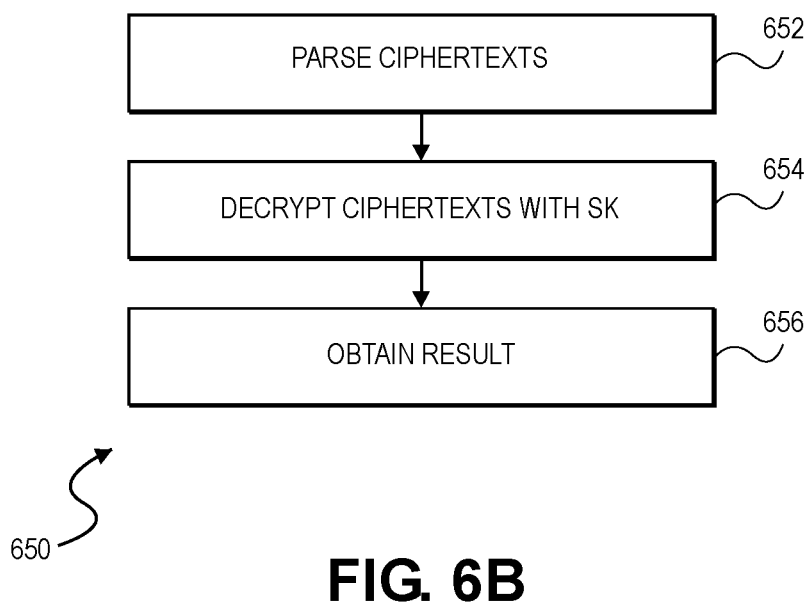
FIG. 6B illustrates an exemplary method for decrypting the secure integer comparison result in an additively homomorphic encryption scheme for certain embodiments.

FIG. 6B illustrates a method 650 for decrypting result 116 in an AHE scheme. As described above, for an AHE scheme, result 116 may comprise μ ciphertexts with at most one ciphertext encrypting 0 and the remaining ciphertexts encrypting a random plaintext. At step 652, client 102 may parse result 116 to obtain a list of μ ciphertexts. At step 654, client 102 may iteratively decrypt the list of ciphertexts. Decryption may be performed using the private key SK from the one-time key generation. Each ciphertext, when decrypted, may return zero or a random value. At step 656, output 110 may be obtained. If any of the decrypted bits returned zero, client 102 may learn that client input 104 was greater than or equal to server input 108. Otherwise, if none of the decrypted ciphertexts returned zero, client 102 may learn that client input 104 was not greater than or equal to server input 108.

Protocol 100 and the above-described methods may be modified for certain use cases. For example, as described above, in an AHE scheme, creating binary tree 114 according to method 300 and/or method 350 may result in a binary tree 114 comprising only paths that can evaluate to zero (i.e., paths that are labeled with integers larger than or equal to server input 108). Recall that for the AHE case, server 106 may send μ ciphertexts (i.e., one ciphertext for each path in binary tree 114) to client 102 as result 116. If server input 108 is zero, because all paths may be larger than or equal to zero, the resulting binary tree 114 may comprise μ+1 leaves, thus result 116 may comprise μ+1 ciphertexts. If μ+1 ciphertexts are sent back to client 102, client 102 may be able to learn more information than just the desired output 110. As such to handle the AHE case wherein server input 108 is zero, when creating binary tree 114, server 106 may replace the first encrypted bit of client input 104 (i.e., $[\![x[\mu]]\!]$) with a ciphertext of 0 ($[\![0]\!]$) and omit the rightmost path of binary tree 114 during evaluation of binary tree 114.

Another use case which may require modifications to protocol 100 occurs when output 110 is shared between client 102 and server 106. In two-party comparison protocols, such as the Damgard-Geisler-Kroigaard (DGK) comparison protocol and variations thereof, it is common for client 102 and server 106 to share output 110 in the form of a comparison bit b. In such an embodiment, output 110 may be split into $b_s$, held by server 106, and $b_c$, sent from server 106 to client 102, such that $b=b_c \oplus b_s$. In some embodiments, server 106 may choose between computing greater-than (i.e., client input 104≥server input 108) or less-than (i.e., client input 104≤server input 108) functionality when implementing protocol 100 as described above. In some embodiments, server 106 flips a random coin, $b_s$, to determine whether to compute greater than functionality or less than functionality. If the random coin flip returns zero, the greater than functionality may be computed, otherwise the less than functionality may computed by creation of the inverse normal comparison binary tree.

Figure 7A:
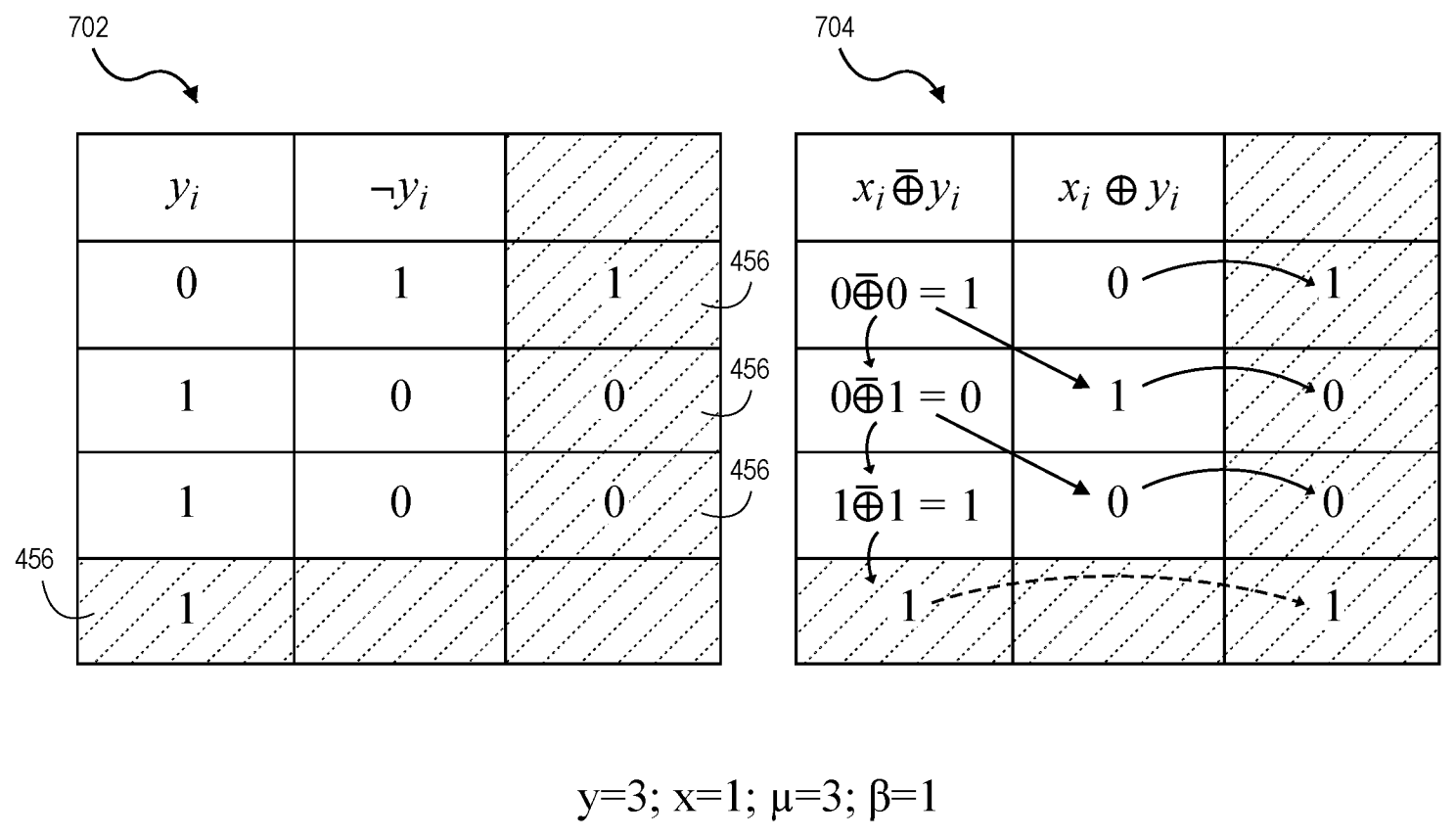

FIG. 7A illustrates a binary tree array 702 corresponding to the example normal comparison binary tree 450 illustrated in FIG. 4B for some embodiments. In some embodiments, a simpler data structure than binary tree 114 may be utilized for the secure integer comparison and evaluation to improve computational efficiency. As illustrated in FIG. 7A, binary tree array 702 may be constructed and used to evaluate the inequality between client input 104 and server input 108. Evaluating binary tree array 702 instead of binary tree 114 may result in increased computational efficiency. In some embodiments, binary tree array 702 comprises a two-dimensional array a[(1, ..., μ), (1,2,3)] comprising μ+1 rows and three columns. In some embodiments, binary tree array 702 is initialized with normal comparison binary tree 450 based on server input 108.

In the first column, binary tree array 702 may store the edge labels 454 from the leftmost path of normal comparison binary tree 450 (i.e., the binary representation of server input 108). The second column may store the right-oriented paths, starting from the first row of binary tree array 702 to the last row of binary tree array 702. As such, the bottom row and the rightmost row of binary tree array 702 may store the labels of leaf nodes 456 of normal comparison binary tree 450. In some embodiments, in the bottom row of binary tree array 702, only the first cell is filled. The first cell in the bottom row may be one if FHE and zero if AHE. Binary tree array 702 may be evaluated against a client input 104 as illustrated in evaluation array 704 and according to method 750 outlined in FIG. 7B. In evaluation array 704, the arrows illustrate path evaluations, wherein a→b means that a and b are aggregated and the result stored in b.

Figure 7B:
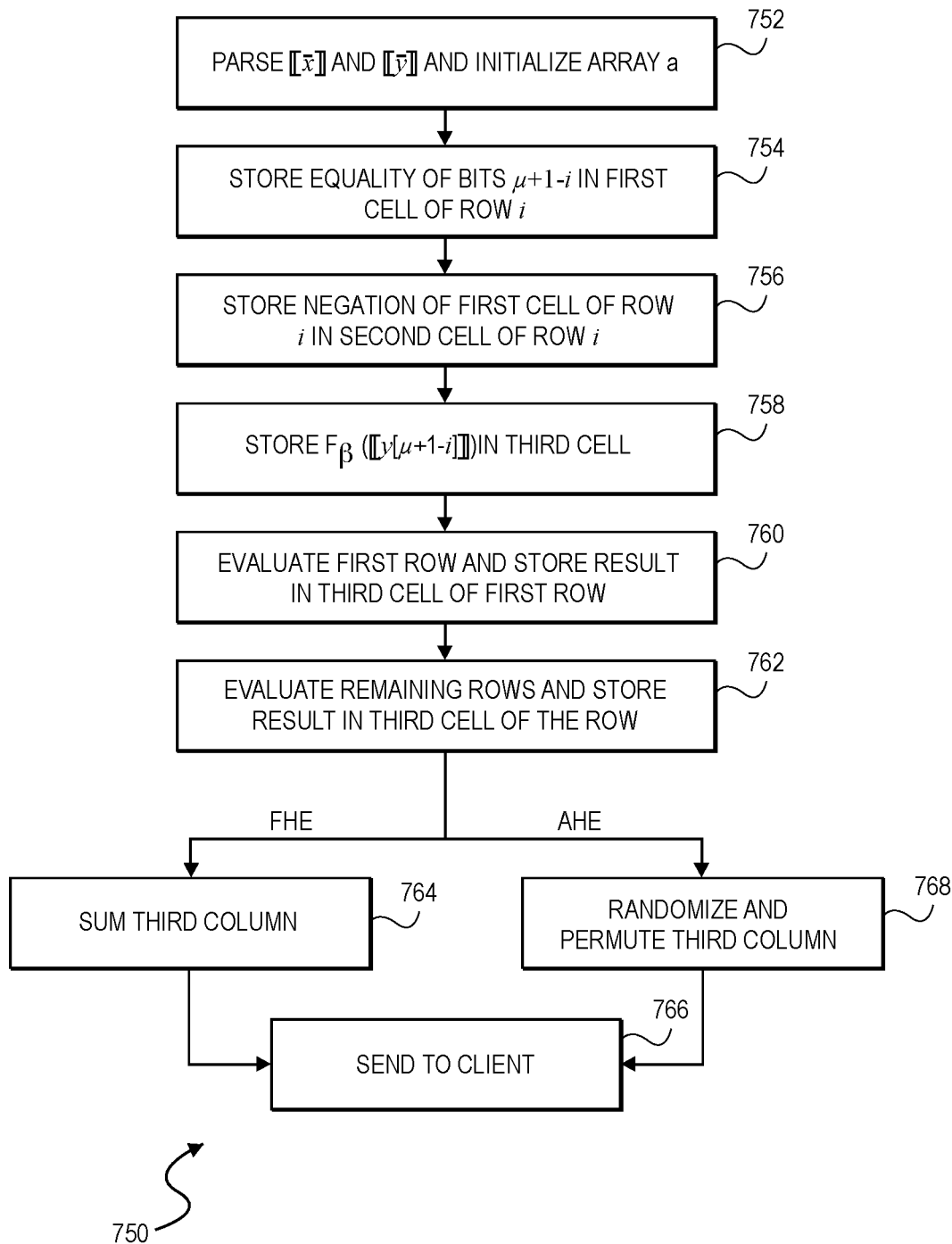
FIG. 7B illustrates an exemplary method for evaluating the example array for certain embodiments.

FIG. 7B illustrates an exemplary method 750 for evaluating binary tree array 702 with a client input 104. The evaluation of binary tree array 702 is illustrated in evaluation array 704, corresponding to an example case wherein client input 104 equals one. As described above, client 102 and server 106 may encrypt their inputs and send them to a third-party server for evaluation. At step 752, the encrypted client input 112 and encrypted server input 108 may be parsed into encrypted bits, and binary tree array 702 is initialized. Next, at step 754, the equality of the current bits is stored in the first cell of each row. That is, $x_i \oplus y_i$ may be computed for each encrypted bit of client input 104 and server input 108.

At step 756, the negation of the equality of the current bits of client input 104 and server input 108 may be stored in the second cell for each row. In some embodiments, $x_i \oplus y_i$ may be computed for each encrypted bit of client input 104 and server input 108. At step 758, $F_\beta(y[i])$ may be stored in the third cell. Step 754, step 756, and step 758 substantially correspond to the computation of decision bits, aggregation of decision bits, and storing the aggregation at leaf nodes 456 as outlined above with respect to steps 502-508.

At step 760, the first row of evaluation array 704 may be evaluated. In some embodiments, the first row of evaluation array 704 is evaluated differently from the rest of the rows in evaluation array 704. For the first row, the second and third cell may be multiplied together, and the result may be stored in the third cell. The multiplication operation is indicated by the arrow from the second cell to the third cell. As such, for the example shown in FIG. 7A, 0 is multiplied by 1 and the result 0 is stored (not shown) in the third cell. As such, $F_\beta(y[i])$, calculated at step 758 and stored in the third cell, may be overwritten, and replaced with the multiplication result at step 760.

Next, at step 762, the remaining rows of the binary tree array 702 may be evaluated. For the remaining rows, a[i,1] and a[i−1,1] may be multiplied together and stored in a[i, 1], corresponding to the aggregation of the leftmost path of binary tree array 702. Additionally, a[i−1, 1], a[i, 2], and a[i, 3] may be multiplied together, and the result is stored in a[i, 3], corresponding to the evaluations of the paths having right child nodes. After these multiplications, the first cell of the last row (which was initially 1 if FHE or 0 if AHE, now holds the aggregation of comparison bits on the leftmost path) may then be copied over to the last cell of the last row, as indicated with the dashed arrow in evaluation array 704.

Processing may then proceed to step 764 if the scheme is FHE or step 766 if the scheme is AHE. At step 764, the third column of binary tree array 702 is summed. This corresponds to evaluation of leaf nodes 456 as described above. Once summed, at step 768, result 116 may be sent to client 102 for decryption. If the scheme is AHE, at step 766, the third column may be permuted. At step 768, the permutation is sent back to client 102 with ciphertexts randomized for decryption.

In some embodiments, for the constant case (i.e., the server input y is unencrypted), the implementation may be further optimized by having client 102 send $[\![x[i] \oplus 1]\!]$ to server 106 instead of ⟦ x[i] ⟧ . As such, server 106 may only need to compute ⟦ x[i]⊕0 ⟧ =⟦ ¬(x[i]⊕1 ⟧ , thereby reducing the number of additions by the bitlength μ of client input 104 and server input 108 without any increase in the communication cost. The computation of client 102 as x[i]⊕1 may be done in plaintext before being encrypted.

Figure 8:
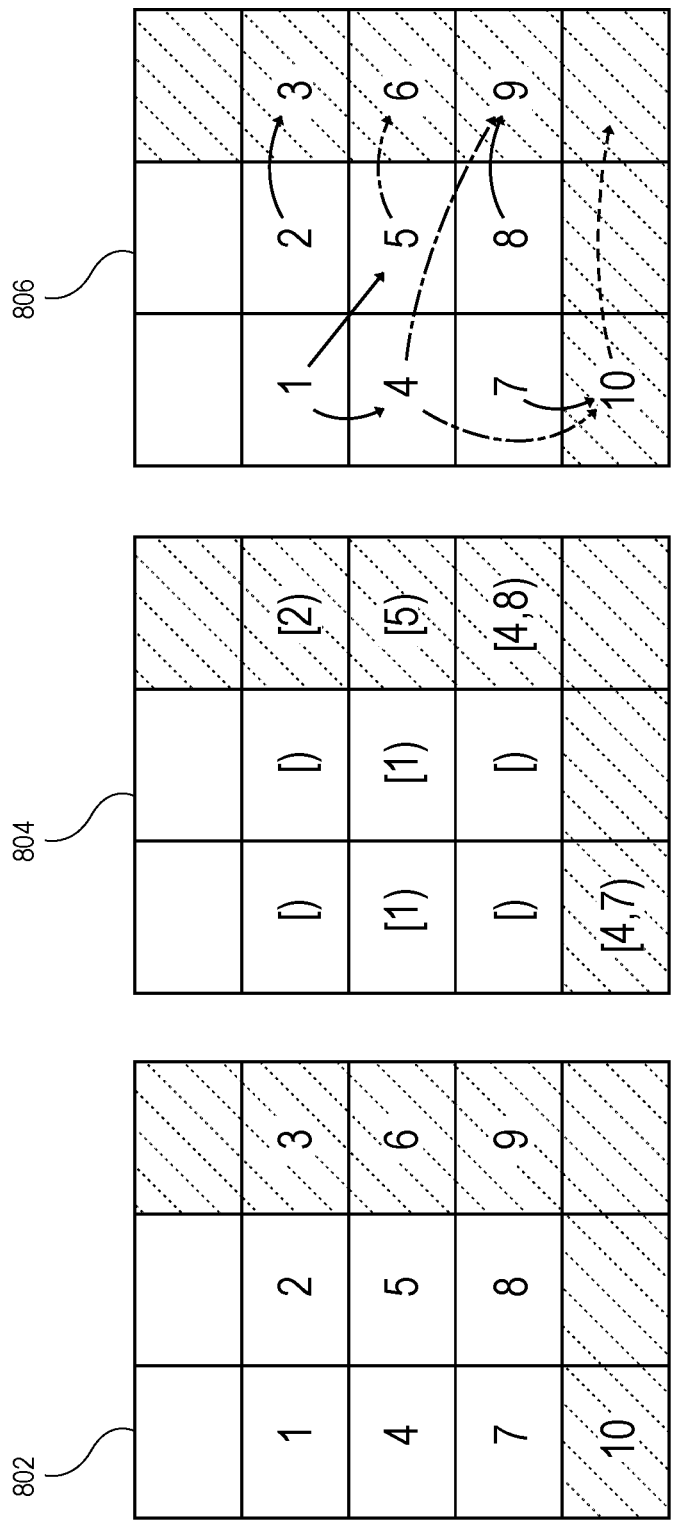
FIG. 8 illustrates an evaluation of a dependency list table for a leveled fully homomorphic encryption scheme for some embodiments.

For the FHE scheme, the multiplicative depth of the procedure may be relevant if the FHE scheme is a leveled FHE scheme, wherein multiplication operations are only supported until a certain depth without bootstrapping as described above. In some embodiments, a leveled FHE scheme has a fixed parameter L such that circuits with depth at most L can be evaluated without bootstrapping. In some embodiments, the inner nodes of binary tree 114 are evaluated as described above using $X_{OR}$ operations, while multiplication uses a direct acyclic graph. In some embodiments, the direct acyclic graph comprises a graph with directed edges in which there are no cycles. This evaluation is illustrated in FIG. 8.

To evaluate the direct acyclic graph, a dependency list table 804 may be computed for each element of binary tree array 702. Left table 802 corresponds to binary tree array 702 wherein the cells have been renumbered 1 to 10 for clarity of illustration. In some embodiments, the dependency list is a stack, represented as [), with bottom [ and top ), that comprises the cells' numbers along a multiplication path, whereby the multiplication path is the set of cells that must be multiplied together. For left table 802, the multiplication paths are (1, 4, 7, 10), (1, 4, 8, 9), (1, 5, 6), and (2, 3) in the illustrated example. Each multiplication path is evaluated by first identifying a list of nodes. To identify the nodes, elements are grouped into pairs. The first element in a pair is added to the dependency list of the second element in the pair. The node list may then be reduced by all elements that occur in any dependency list. These steps may then be repeated until there is only a single element left. For example, if a multiplication path comprises nodes a, b, c, d, in this order, then the dependency lists are as follows: [), [a), [), [b, c). Notably, the computation of dependency list table 804 does not depend on server input 108 but rather on the structure of the binary tree. As such, advantageously, the dependency list table 804 may be computed a single time and given as an input to protocol 100.

Evaluation table 806 illustrates the evaluation of dependency list table 804. The arrows shown in evaluation table 806 are computed according to the dependency list. That is, if cell b has a in its dependency list, then there is an arrow a→b. The solid arrows have a multiplicative depth of one, and the dashed arrows have a multiplicative depth of two. As described above, the multiplication stage of protocol 100 may be done using dependency list table 804. For the multiplication, evaluation table 806 may be traversed from top to bottom and from left to right, with the aggregated result of each cell computed using its dependency list. For example, using the dependency lists [), [a), [), [b, c), there is nothing to do for nodes a and c because their dependency lists are empty. For node b, b←a·b may be computed. For node d, d←c·d may first be computed, followed by d←b·d. Following this procedure, the use of the dependency list table 804 may reduce the multiplication depth on a binary tree 114 having a path of length k from k to log(k).

As mentioned above, embodiments herein may have applications in various fields such as machine learning, secure auctions, benchmarking, and the like. Protocol 100 may be output expressive and integrated as part of a larger application. Output 110 may have further operations applied thereto once determined decrypted by client 102. In some embodiments, server 106 may send result 116 for further applications.

While embodiments have been described herein with respect to comparing integers between a client-server pair, it should be noted that protocol 100 may be ran with multiple clients. For example, in a secure auction setting, protocol 100 may be ran with all auction participants. A first pair of participants may be selected to send their bids to an auction host. One participant in the pair may function as client 102, and the second participant in the pair may function as server 106. Both participants may send their inputs encrypted to the auction host. Once the highest bidder is determined with protocol 100, the auction host may pair the highest bidder with another auction participant. This process may then repeat until the overall highest bidder is determined. As such, the auction participants may have their bids securely compared without any of the other participants or the auction host learning the actual value of their bids.

Figure 9:
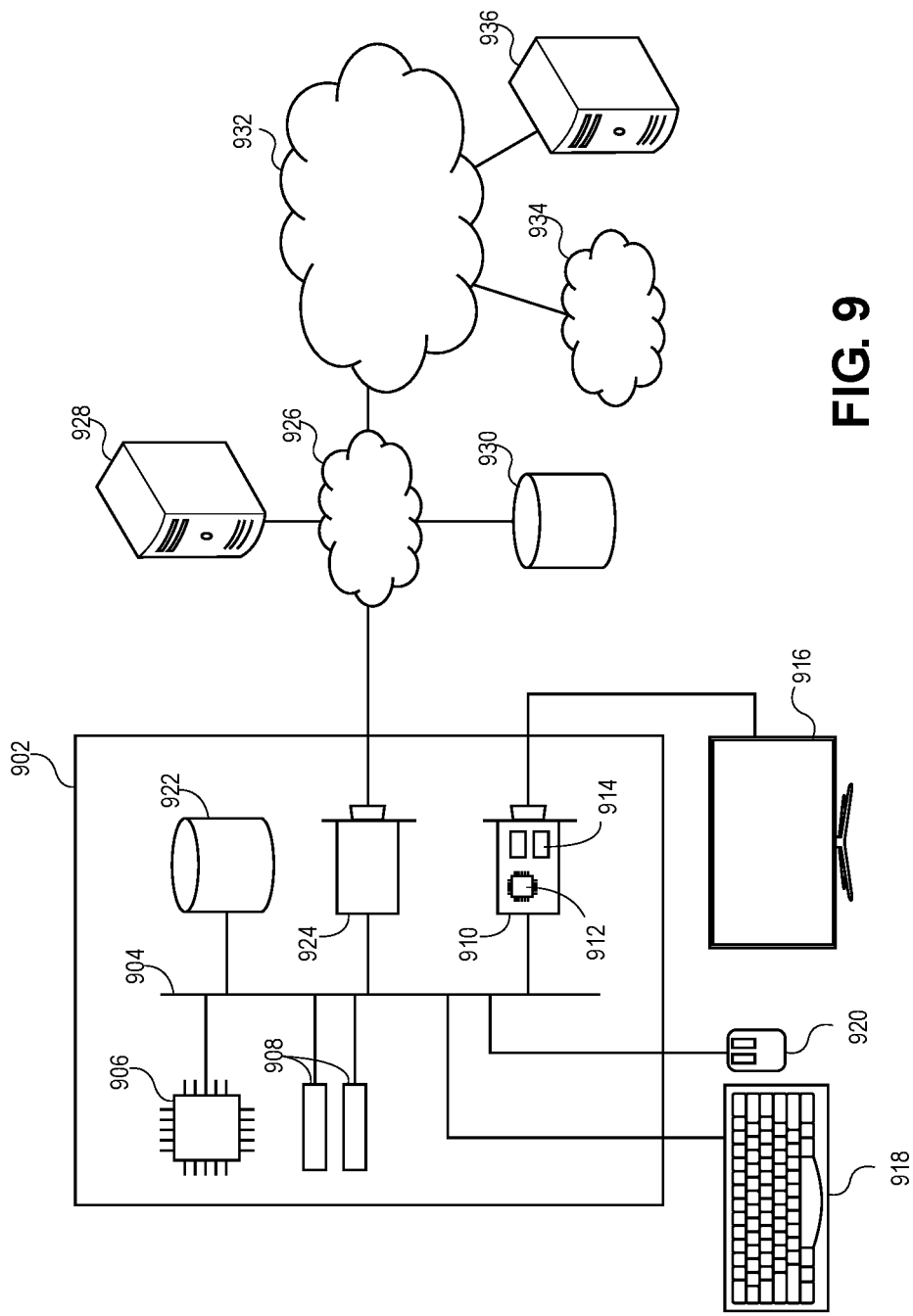
FIG. 9 illustrates an exemplary hardware platform for certain embodiments.

Turning now to FIG. 9, in which an exemplary hardware platform for certain embodiments is depicted. Computer 902 can be a desktop computer, a laptop computer, a server computer, a mobile device such as a smartphone or tablet, or any other form factor of general- or special-purpose computing device containing at least one processor. Depicted with computer 902 are several components, for illustrative purposes. In some embodiments, certain components may be arranged differently or absent. Additional components may also be present. Included in computer 902 is system bus 904, via which other components of computer 902 can communicate with each other. In certain embodiments, there may be multiple busses or components may communicate with each other directly. Connected to system bus 904 is central processing unit (CPU) 906. Also attached to system bus 904 are one or more random-access memory (RAM) modules 908. Also attached to system bus 904 is graphics card 910. In some embodiments, graphics card 910 may not be a physically separate card, but rather may be integrated into the motherboard or the CPU 906. In some embodiments, graphics card 910 has a separate graphics-processing unit (GPU) 912, which can be used for graphics processing or for general purpose computing (GPGPU). Also, on graphics card 910 is GPU memory 914. Connected (directly or indirectly) to graphics card 910 is display 916 for user interaction. In some embodiments no display is present, while in others it is integrated into computer 902. Similarly, peripherals such as keyboard 918 and mouse 920 are connected to system bus 904. Like display 916, these peripherals may be integrated into computer 902 or absent. Also connected to system bus 904 is local storage 922, which may be any form of computer-readable media, such as non-transitory computer readable media, and may be internally installed in computer 902 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 924 is also attached to system bus 904 and allows computer 902 to communicate over a network such as network 926. NIC 924 can be any form of network interface known in the art, such as Ethernet, ATM, fiber, Bluetooth, or Wi-Fi (i.e., the Institute of Electrical and Electronics Engineers (IEEE) 802.11 family of standards). NIC 924 connects computer 902 to local network 926, which may also include one or more other computers, such as computer 928, and network storage, such as data store 930. Generally, a data store such as data store 930 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 928, accessible on a local network such as local network 926, or remotely accessible over public Internet 932. Local network 926 is in turn connected to public Internet 932, which connects many networks such as local network 926, remote network 934 or directly attached computers such as computer 936. In some embodiments, computer 902 can itself be directly connected to public Internet 932.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the present teachings have been described with reference to the embodiments illustrated in the attached drawing figures, it is noted that equivalents may be employed, and substitutions made herein without departing from the scope of the present teachings as recited in the claims.

Having thus described various embodiments, what is claimed as new and desired to be protected by Letters Patent includes the following:

1. One or more non-transitory computer-readable media storing computer-executable instructions that, when executed by a processor, perform operations for secure integer comparison between integers x and y using binary decision trees, the operations comprising:
    receiving, at a server and from a client, a public encryption key and a first encrypted input, the first encrypted input representing x encrypted with the public encryption key;
    creating, at the server, based on y, a binary tree;
    evaluating, at the server, the first encrypted input on the binary tree, the evaluation comprising:
        computing decision bits along a plurality of paths of the binary tree;
        aggregating the decision bits along each path of the binary tree, the aggregated decision bits stored at a leaf node of each path; and
        evaluating the leaf node of each path to obtain an encrypted comparison result, the encrypted comparison result being an encrypted single digit indicating whether x is less than y; and
    sending, from the server to the client, the encrypted comparison result for decryption by the client, the encrypted comparison result encrypted using the public encryption key.

2. The non-transitory computer-readable media of claim 1, wherein the operations further comprise receiving, from the client, a decryption of the encrypted comparison result.

3. The non-transitory computer-readable media of claim 1, wherein creating the binary tree comprises:
    identifying a path representing y;
    labeling a leaf node for the path and all leaf nodes right of the path with one; and
    labeling all leaf nodes left of the path with zero.

4. The non-transitory computer-readable media of claim 1, wherein the operations further comprise computing a less-than comparison by creating an inverse normal comparison binary tree.

5. The non-transitory computer-readable media of claim 1,
wherein evaluating the leaf node of each path of the binary tree comprises:
computing a cost attribute for each leaf in the binary tree; and
summing the cost attribute for each leaf in the binary tree.

6. The non-transitory computer-readable media of claim 1,
wherein evaluating the first encrypted input on the binary tree comprises:
randomizing, by the server, a plurality of ciphertexts, each ciphertext in the plurality of ciphertexts associated with a leaf node of the binary tree.

7. The non-transitory computer-readable media of claim 6, wherein the operations further comprise:
adding at least one other random ciphertext to the plurality of ciphertexts; and
permuting the plurality of ciphertexts.

8. A method for secure integer comparison between integers x and y using binary decision trees, comprising:
receiving, at a server and from a client, a public encryption key and a first encrypted input, the first encrypted input representing x encrypted with the public encryption key;
creating, at the server, based on y, a binary tree;
evaluating, at the server, the first encrypted input on the binary tree, the evaluation comprising:
computing decision bits along a plurality of paths of the binary tree;
aggregating the decision bits along each path of the binary tree, the aggregated decision bits stored at a leaf node of each path; and
evaluating the leaf node of each path to obtain an encrypted comparison result, the encrypted comparison result being an encrypted single digit indicating whether x is less than y; and
sending, from the server to the client, the encrypted comparison result for decryption by the client, the encrypted comparison result encrypted using the public encryption key.

9. The method of claim 8, further comprising receiving, from the client, a decryption of the encrypted comparison result.

10. The method of claim 8, wherein creating the binary tree comprises:
identifying a path representing y;
labeling a leaf node for the path and all leaf nodes right of the path with one; and
labeling all leaf nodes left of the path with zero.

11. The method of claim 8, further comprising computing a less-than comparison by creating an inverse normal comparison binary tree.

12. The method of claim 8,
wherein evaluating the leaf node of each path of the binary tree comprises:
computing a cost attribute for each leaf in the binary tree; and
summing the cost attribute for each leaf in the binary tree.

13. The method of claim 8,
wherein evaluating the first encrypted input on the binary tree comprises:
randomizing, by the server, a plurality of ciphertexts, each ciphertext in the plurality of ciphertexts associated with a leaf node of the binary tree.

14. The method of claim 13, further comprising:
adding at least one other random ciphertext to the plurality of ciphertexts; and
permuting the plurality of ciphertexts.

15. A non-transitory machine-readable medium storing instructions which, when executed by one or more processors, cause the one or more processors to perform operations for secure integer comparison between integers x and y using binary decision trees, the operations comprising:
receiving, at a server and from a client, a public encryption key and a first encrypted input, the first encrypted input representing x encrypted with the public encryption key;
creating, at the server, based on y, a binary tree;
evaluating, at the server, the first encrypted input on the binary tree, the evaluation comprising:
computing decision bits along a plurality of paths of the binary tree;
aggregating the decision bits along each path of the binary tree, the aggregated decision bits stored at a leaf node of each path; and
evaluating the leaf node of each path to obtain an encrypted comparison result, the encrypted comparison result being an encrypted single digit indicating whether x is less than y; and
sending, from the server to the client, the encrypted comparison result for decryption by the client, the encrypted comparison result encrypted using the public encryption key.

16. The non-transitory machine-readable medium of claim 15, wherein the operations further comprise receiving, from the client, a decryption of the encrypted comparison result.

17. The non-transitory machine-readable medium of claim 15, wherein creating the binary tree comprises:
identifying a path representing y;
labeling a leaf node for the path and all leaf nodes right of the path with one; and
labeling all leaf nodes left of the path with zero.

18. The non-transitory machine-readable medium of claim 15, wherein the operations further comprise computing a less-than comparison by creating an inverse normal comparison binary tree.

19. The non-transitory machine-readable medium of claim 15,
wherein evaluating the leaf node of each path of the binary tree comprises:
computing a cost attribute for each leaf in the binary tree; and
summing the cost attribute for each leaf in the binary tree.

20. The non-transitory machine-readable medium of claim 15,
wherein evaluating the first encrypted input on the binary tree comprises:
randomizing, by the server, a plurality of ciphertexts, each ciphertext in the plurality of ciphertexts associated with a leaf node of the binary tree.

* * * * *